T. T. Prosser,
Scroll Sawing Machine,
N° 15,438.                Patented July 29, 1856.
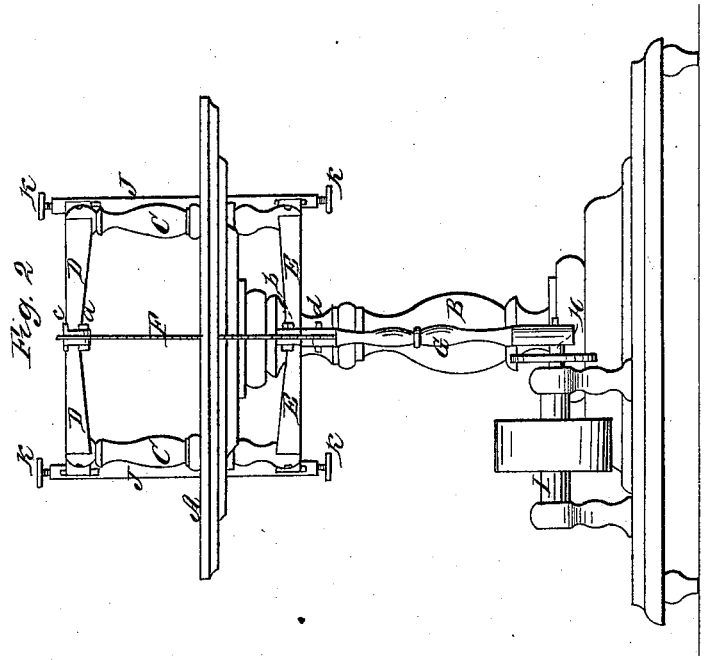
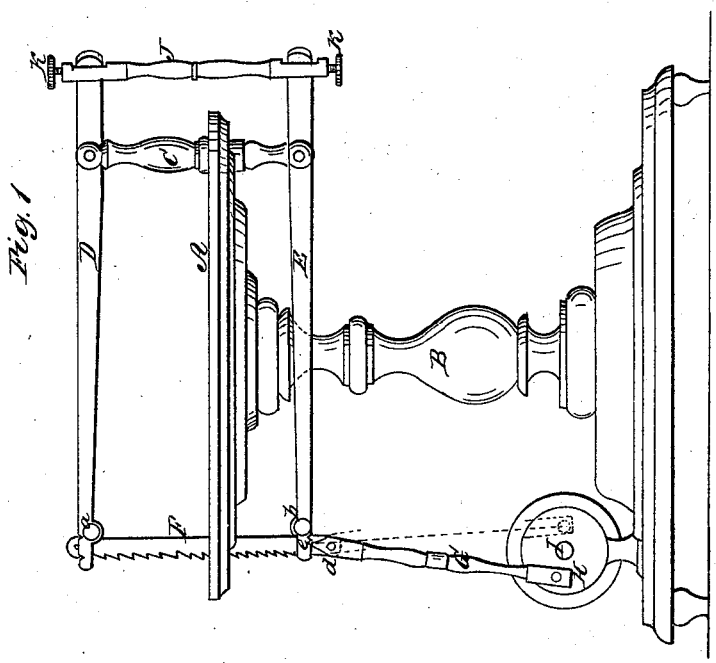

UNITED STATES PATENT OFFICE.

T. T. PROSSER, OF OCONOMOWOCK, WISCONSIN.

SAWING-MACHINE.

Specification of Letters Patent No. 15,438, dated July 29, 1856.

*To all whom it may concern:*

Be it known that I, T. T. PROSSER, of Oconomowock, in the county of Waukesha and State of Wisconsin, have invented a new and Useful Improvement in Hanging and Straining Reciprocating Saws Without a Sash or Frame, and Technically termed Muley-Saws; and I do hereby declare that the following is a full, clear, and exact description of the same, reference being had to the annexed drawings, making a part of this specification, in which—

Figure 1, is a side view of my improvement. Fig. 2, is a front view of ditto.

Similar letters of reference indicate corresponding parts in the two figures.

My invention consists in placing the saw between two frames which work upon pivots and are adjusted by set screws. The above parts being constructed and arranged as will be hereinafter fully shown and described.

To enable those skilled in the art to fully understand and construct my invention, I will proceed to describe it.

A, represents a circular bed or platform supported at a suitable height from the ground or flooring by a pedestal B, or any proper framing.

C, C, represent two supports or uprights which pass through the bed or platform at one side, the support or uprights being secured in the bed or platform in any proper manner.

To the upper ends of the supports or uprights there are pivoted levers D, D, one to each. The front ends of these levers are curved or bent and are connected by a screw (*a*). The two levers being in V-form. To the lower ends of the uprights C, C, and below the bed or platform A, there are pivoted two similar levers E, E, the front ends of which are also connected by a screw (*b*).

F, represents the saw, the upper end of which is fitted between the outer or front ends of the upper levers D, D, a pin (*c*), passing through the saw, said pin bearing upon the levers D, D.

The lower end of the saw passes between the outer or front ends of the two lower levers E, E, and is directly attached or pivoted to the upper part of a pitman G, the lower end of which is connected to the usual crank H, on the driving shaft I. The upper end of the pitman G, is slotted vertically and the lower end of the saw F, fits therein and is pivoted to the pitman a short distance below its upper end as shown in both figures (*d*), representing the pivot. The upper end of the pitman is pointed or made with a knife edge and fits in notches (*e*), in the under side of the levers E, E. To the inner or back ends of the two levers on each upright there are attached rods J. The ends of the levers pass through slots in said rods and set screws K, are fitted in the upper and lower ends of the rods J, the inner ends of the screws bearing against the levers.

From the above description of the parts it will be seen that by forcing the back or inner ends of the upper and lower levers D, E, toward each other, by turning the screws K, the saw will be strained perfectly tight, and as the saw works up and down, the levers D, E, work or vibrate on the pivots in the upper and lower ends of the uprights C, C.

As the saw F, descends the pitman G, will move the saw toward its work, as the pivot (*d*), is below its upper end which bear against the levers E and as the saw ascends it will be thrown out from its work so that the dust will have an opportunity of falling from the kerf or cut. By this means the kerf is prevented from being choked with saw dust and much friction is avoided.

The invention is simple and operates well.

Having thus described my invention, what I claim as new and desire to secure by Letters Patent, is,

The levers D, E, pivoted or attached to the uprights, C, C; the saw, F, being placed at one end of the levers, and the levers adjusted by the bars, J, and set screws, K, at the opposite ends; substantially as described, for the purpose set forth.

T. T. PROSSER.

Witnesses:
WM. TUSCH,
B. W. FENWICK.